(12) United States Patent
Wright

(10) Patent No.: US 10,035,526 B2
(45) Date of Patent: Jul. 31, 2018

(54) BRAKE PISTON ASSEMBLY

(71) Applicant: NEW YORK AIR BRAKE, LLC, Watertown, NY (US)

(72) Inventor: Eric C. Wright, Evans Mills, NY (US)

(73) Assignee: New York Air Brake, LLC, Watertown, NY (US)

( * ) Notice: Subject to any disclaimer, the term of this patent is extended or adjusted under 35 U.S.C. 154(b) by 42 days.

(21) Appl. No.: 14/559,504

(22) Filed: Dec. 3, 2014

(65) Prior Publication Data
US 2016/0159377 A1    Jun. 9, 2016

(51) Int. Cl.
| F15B 15/14 | (2006.01) |
| B61H 13/34 | (2006.01) |
| B60T 11/18 | (2006.01) |
| B60T 17/08 | (2006.01) |
| F16J 1/00 | (2006.01) |

(52) U.S. Cl.
CPC .............. *B61H 13/34* (2013.01); *B60T 11/18* (2013.01); *B60T 17/088* (2013.01); *F15B 15/1447* (2013.01); *F16J 1/006* (2013.01)

(58) Field of Classification Search
CPC ........ F16J 1/006; F16J 1/12; F16J 1/14; F16J 1/22; F15B 15/1447; F15B 15/1457
See application file for complete search history.

(56) References Cited

U.S. PATENT DOCUMENTS

| 1,914,268 | A | * | 6/1933 | Crisp | .......................... F16J 1/22 403/131 |
| 2,349,345 | A | * | 5/1944 | Goepfrich | ................ F16J 1/006 74/18.2 |
| 3,473,444 | A | * | 10/1969 | Leffers | ................ F04B 39/0005 74/579 E |
| 4,683,810 | A | * | 8/1987 | Afimiwala | ................ F04B 5/00 403/267 |

(Continued)

FOREIGN PATENT DOCUMENTS

| CH | 404318 A | * 12/1965 | ............ F01B 3/0085 |
| DE | 102009021348 | 12/2009 | |

(Continued)

OTHER PUBLICATIONS

International Search Report Form PCT/ISA/220, International Application No. PCT/&S2014/068380, pp. 1-11, dated Aug. 3, 2015.

*Primary Examiner* — F. Daniel Lopez
*Assistant Examiner* — Matthew Wiblin
(74) *Attorney, Agent, or Firm* — Bond Schoeneck & King, PLLC; David Nocilly

(57) ABSTRACT

A brake cylinder piston assembly having a composite piston head having a bore formed therethrough, a cup positioned in the bore and coupled to the piston head, and a hollow rod securely welded to the cup. The cup is coupled to the piston head by a series of fingers with locking tabs that extend around the bore of the piston head and engage a rim of the cup. The bore of the piston head has two steps that corre- (Continued)

spond to the two steps formed into outside of the cup so the two step outer diameter of the cup is securely seated in the two step inner diameter of the bore. A plastic load disc having a hemispherical cavity may be positioned within the end of the hollow rod that is secured to the cup to absorb high energy hand brake releases.

9 Claims, 6 Drawing Sheets

(56) References Cited

U.S. PATENT DOCUMENTS

| | | | | |
|---|---|---|---|---|
| 4,973,308 A * | 11/1990 | Borras | | A61M 5/508 604/110 |
| 5,335,585 A * | 8/1994 | Fischenich | | F16D 25/12 92/128 |
| 5,499,570 A * | 3/1996 | Bergelin | | B60T 13/52 403/133 |
| 6,336,329 B1 * | 1/2002 | Adler | | B60T 11/16 60/588 |
| 6,446,436 B1 * | 9/2002 | Winkelmann | | B60T 11/165 60/533 |
| 6,899,016 B2 * | 5/2005 | Gemeinhardt | | B60T 11/18 92/128 |
| 8,118,781 B2 * | 2/2012 | Knopper | | A61M 5/14566 604/151 |
| 8,172,814 B2 * | 5/2012 | Cane' | | A61M 5/31515 604/228 |
| 2014/0053721 A1 * | 2/2014 | Ishida | | B60T 11/16 92/172 |
| 2014/0130664 A1 * | 5/2014 | Kabir | | F16J 1/01 92/248 |

FOREIGN PATENT DOCUMENTS

| | | | |
|---|---|---|---|
| EP | 2716920 | 4/2014 | |
| FR | 2168397 A1 * | 8/1973 | ............ B60T 17/085 |
| WO | 20070115524 | 10/2007 | |

* cited by examiner

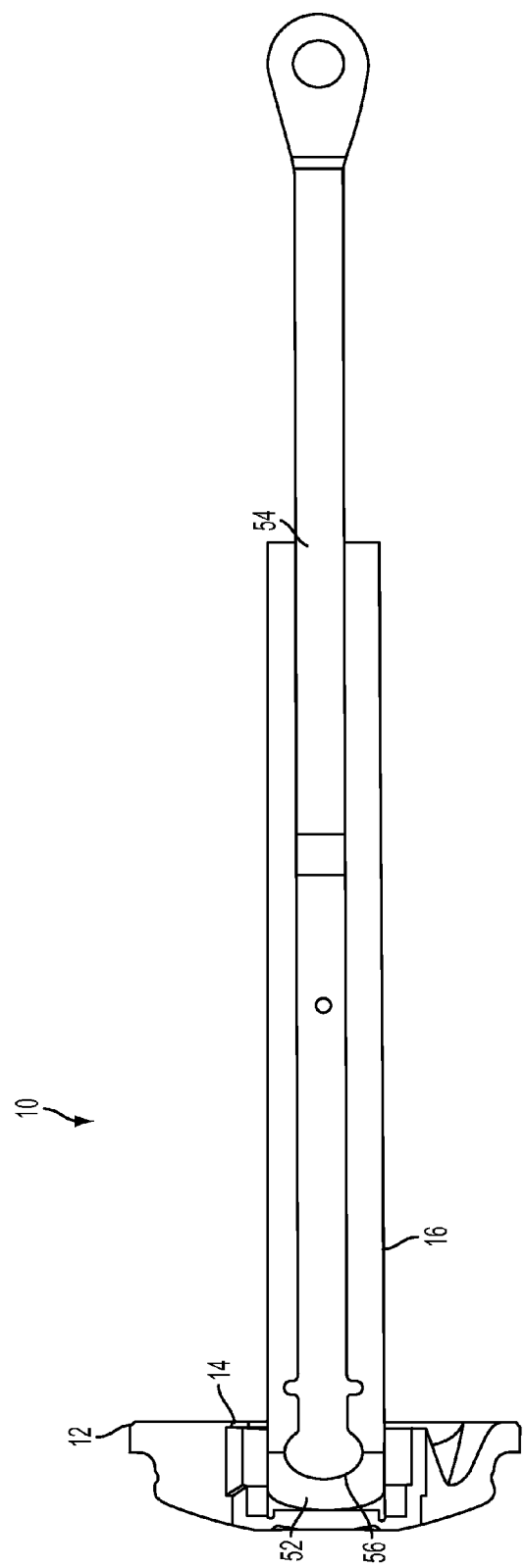

BRAKE PISTON ASSEMBLY

BACKGROUND OF THE INVENTION

1. Field of the Invention

The present invention relates to rail vehicle braking systems and, more specifically, to an improved brake cylinder piston assembly.

2. Description of the Related Art

Railway brake pistons of the type used on Association of American Railroads (AAR) cars are typically heavy and include a large number of parts that must be individually machined. For example, brake cylinder piston heads are made from cast iron and then riveted to a steel hollow rod. Additional machining is often necessary during the assembly process to address mill-run variations, such as in the outer diameter of the hollow rod, and for the line-bore drilling that is required prior to riveting the hollow rod to the cast piston head. Accordingly, there is a need for a brake cylinder piston assembly that eliminates the need for extra machining and provides for a simpler assembly.

BRIEF SUMMARY OF THE INVENTION

The present invention comprises a brake cylinder piston assembly having a composite piston head having a bore formed therethrough, a cup positioned in the bore and coupled to the piston head, and a hollow rod securely welded to the cup. The cup is coupled to the piston head by a series of fingers that extend around the bore of the piston head and grasp the rim of the cup via a set of locking tabs that lock to the rim of the cup. The bore of the piston head includes a first portion having a first inner diameter and a second portion having a second inner diameter that is greater than the first inner diameter. Correspondingly, the cup has a first portion having a first outer diameter and a second portion having a second outer diameter that is larger than the first outer diameter. When the cup and piston head are assembled, the first outer diameter of the cup is securely seated in the first inner diameter of the bore and the second outer diameter of the cup is securely seated in the second inner diameter of the bore. The cup includes a central cavity and the hollow rod is positioned in the cavity. A plastic load disc having a hemispherical cavity may be positioned within the end of the hollow rod that is secured to the cup to absorb high energy hand brake releases.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 6 is a cross-sectional view of a piston assembly and load disc coupled to a push rod according to the present invention.

DETAILED DESCRIPTION OF THE INVENTION

Figure 1:
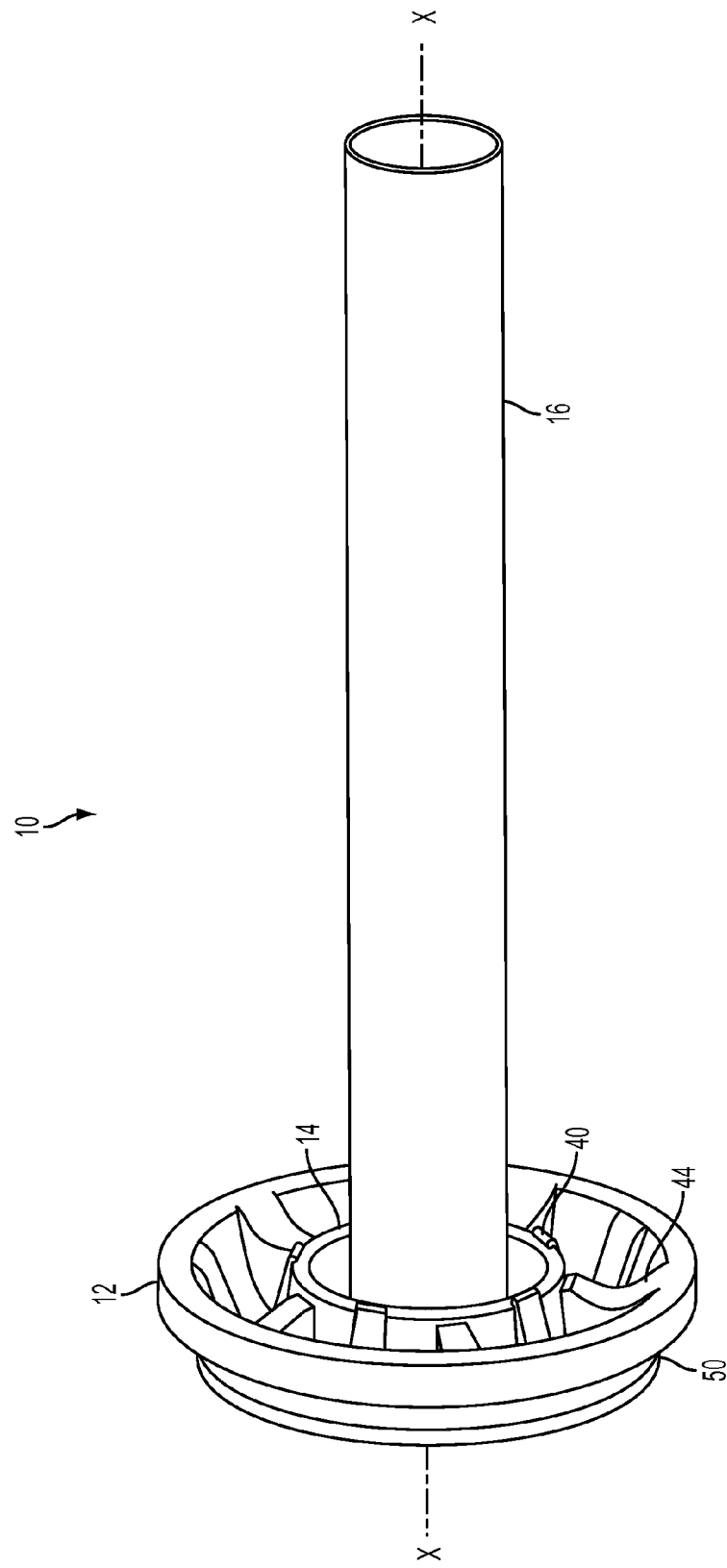
FIG. 1 is a perspective view of a brake piston assembly according to the present invention.
Figure 2:
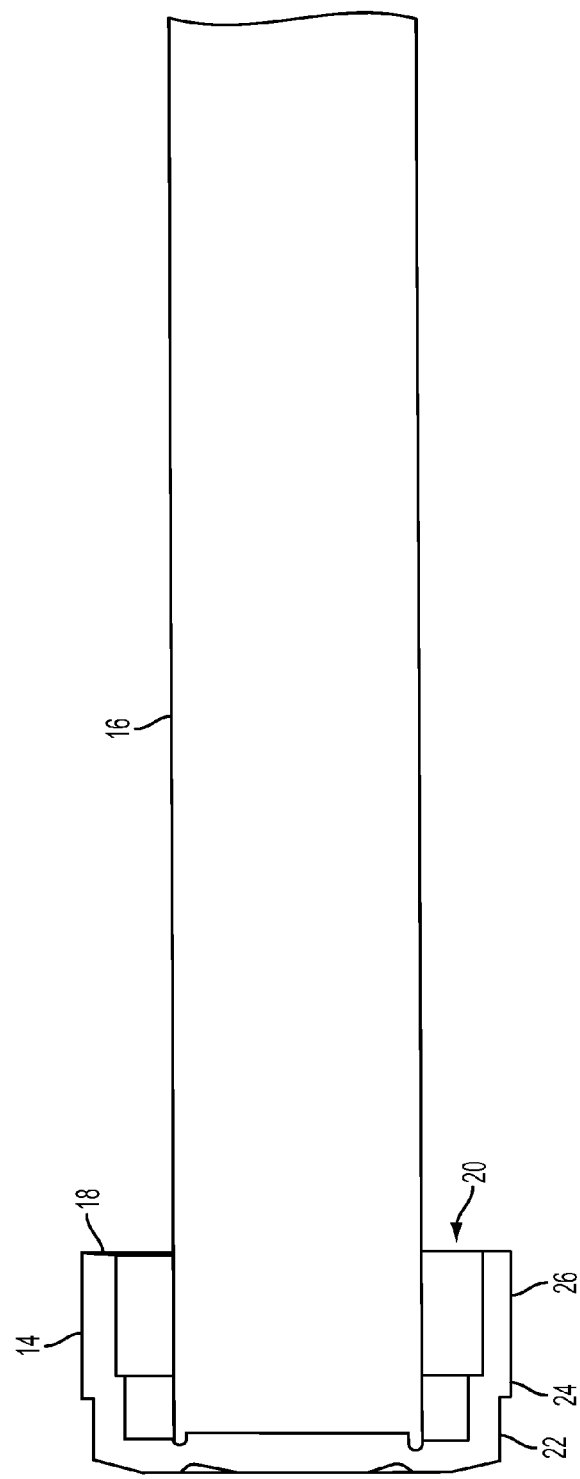
FIG. 2 is a cross-sectional view of a piston cup and hollow rod according to the present invention.

Referring now to the drawings, wherein like reference numerals refer to like parts throughout, there is seen in FIG. 1 a piston assembly 10 according to the present invention for use with AAR-type brake cylinders. Piston assembly 10 comprises a piston head 12, a contoured cup 14 coupled to piston head 12, and a hollow rod 16 secured to cup 14. As seen in FIG. 2, contoured cup 14 has a rim 18 defining a central cavity 20. The outer surface of cup 14 includes a first step 22 having a first outer diameter separated by a shoulder 24 from a second step 26 having a second, larger outer diameter. Cup 14 may be stamped or spun from metal and coupled to hollow rod 16 by welding, such as by friction welding, to provide a strong, water-tight assembly that does not require any subsequent machining before attaching cup 14 to piston head 12.

Figure 3:
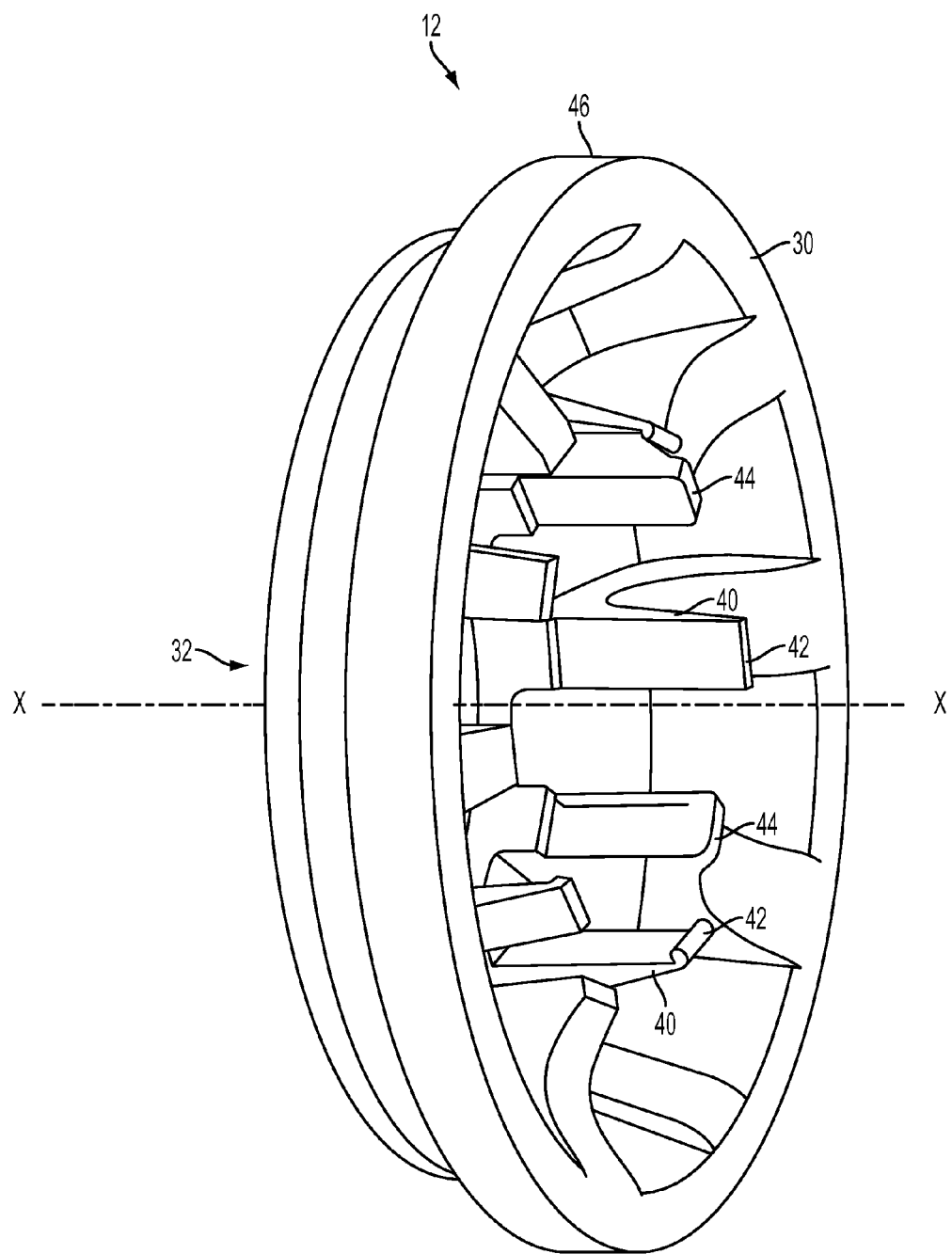
FIG. 3 is a perspective view of a piston head according to the present invention.
Figure 4:
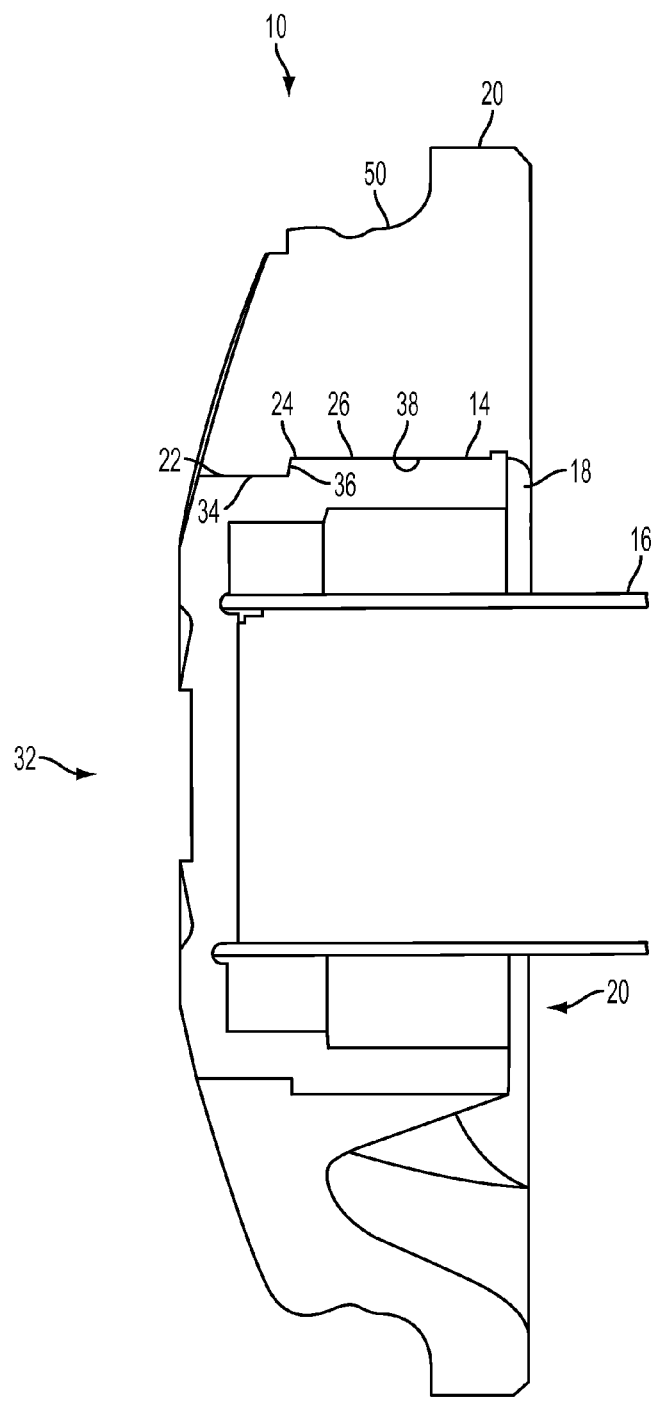
FIG. 4 is a cross-sectional view of a brake piston assembly according to the present invention.

Referring to FIG. 3, piston head 12 includes a body 30 with a central bore 32 formed therethough and extending along an axis X-X. Bore 32 includes a first step 34, as seen in FIG. 4, having a first inner diameter separated by a shoulder 36 from a second step 38 having a second, larger inner diameter. First step 34 and second step 38 of bore 32 correspond in dimension to first step 22 and second step 26 of cup 14, thereby allowing cup 14 to be securely press fit into bore 32 to securely attach cup 14 to body 30 of piston head 12. The stepped connection between cup 14 and piston head 12 operates to transfer the axial brake load between piston head 12 and hollow rod 16. Body 30 of piston head 12 further includes a series of flexible fingers 40 positioned around bore 32 and extending outwardly from body 30 in parallel to axis X-X. Each finger 40 includes a locking tab 42 at its free end that will securely engage rim 18 of cup 14 when cup 14 is inserted into bore 32 of piston head 12. Body 30 further includes a series of ribs 44 that extend from the outer edge of body 30 to bore 32 and are interspersed between locking fingers 40. Ribs 44 provide structural support to prevent distortion of piston head 12 when the piston assembly 10 is pressured, such as when the rail vehicle brakes are applied. Piston head 12 also includes an integral piston guide ring 46 and profile 50 formed into the outer contour of piston head 12, such as by including a profile that will accept the AAR-standard packing cup that is snapped onto a piston head prior to installing in a brake cylinder. Piston head 12 is preferably made from a composite material, such as Dupont Zytel HTN51G35HSL or HTN51G45HSL, or similar high strength engineering polymer, formed by a process such as injection molding, to integrally include the various features discussed above.

Piston assembly 10 is assembled by aligning bore 32 of piston head 12 with the outer diameter of cup 14 and then pressing the two elements together axially until shoulder 36 of bore 32 of piston head 12 engages shoulder 28 of cup 14 and locking fingers 40 engage rim 18 of cup 14 so that locking tabs 42 on the ends of fingers 40 securely grasp rim 18 of cup 14.

Figure 5:
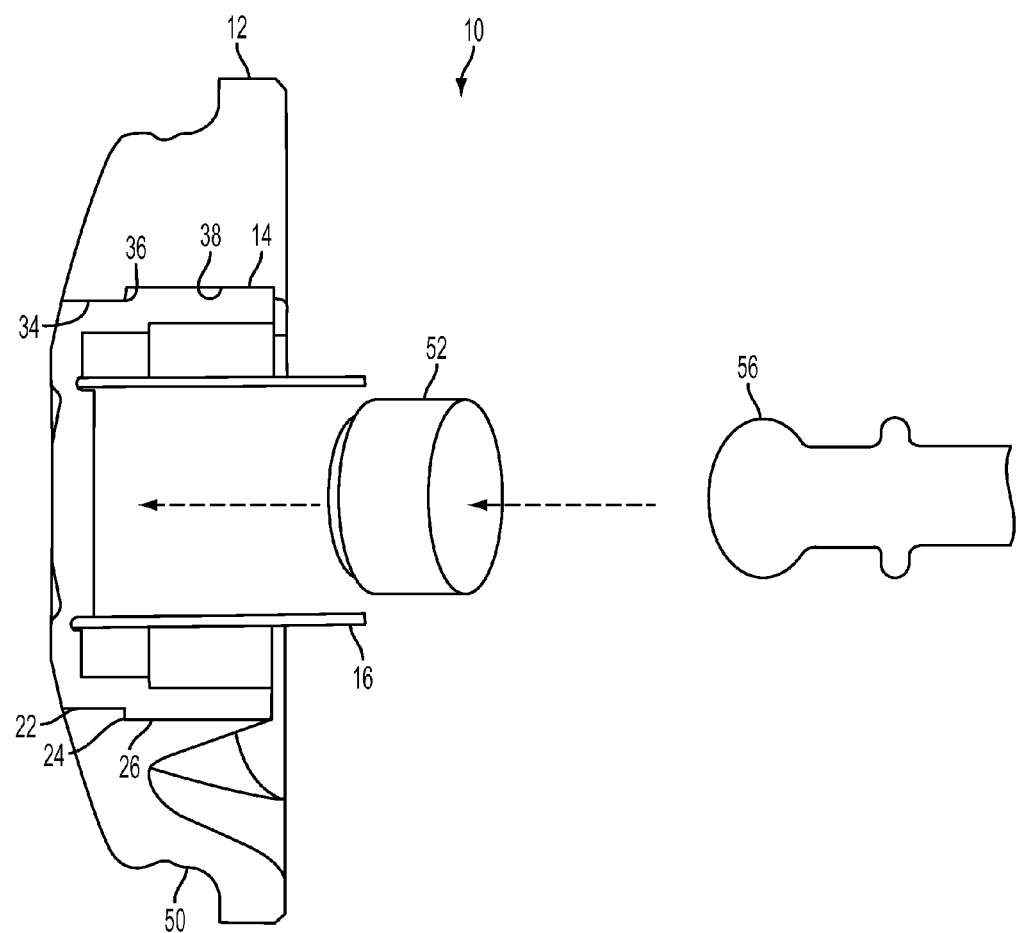
FIG. 5 is a cross-sectional view of a piston assembly and load disc according to the present invention.

Referring to FIG. 5, assembly 10 may also include a load disc 52 that is contoured to match the spherical end 56 of a standard AAR brake cylinder push rod 54 and positioned in the end of hollow rod 16 that is secured to cup 14. For example, the open surface of load disc 52 may include a dish-shaped or hemispherical cavity 58 having a radius of curvature that corresponds to the radius of curvature of spherical end 56 of push rod 54 to maximize the amount of surface contact between hemispherical cavity 58 and spherical end 56 of push rod 54. Load disc 52 transfers the braking load uniformly to cup 14 and acts as a cushion to protect cup 14 from the high energy impact of the brake cylinder push rod 54, which can occur when the hand brake is released on the rail vehicle. A hand brake application will often pull spherical end 56 of the push rod 54 away from brake cylinder piston head 12 and, when the hand brake is released, the large amount of stored stain energy in the brake rigging causes brake cylinder push rod 54 to return quickly and impact piston head 12 with high energy. Load disc 52 will absorb some of that energy and cause the load to be spread evenly over piston head 12. Load disc 52 is preferably made from injection molded plastic.

Assembly 10 is interchangeable with prior art assemblies, but eliminates the need to machine piston head 12 to fit hollow rod 16, eliminates blind riveting operations, provides a snap-together assembly of the pre-profiled composite piston head 12 to hollow rod 16. Assembly 10 also provides an energy and load distributing load disc 52 and integrates a piston guide ring into composite piston head 12. As a result, assembly 10 is lighter weight, and composite piston head 12 will not corrode or contaminate the brake cylinder assembly with corrosion products.

What is claimed is:

1. A brake cylinder piston assembly, comprising:
   a piston head having a bore formed therethrough that defines a first portion having a first inner diameter and a second portion having a second inner diameter that is greater than the first inner diameter;
   a cup having a central cavity defined by a first portion having a first outer diameter and a second portion having a second outer diameter that is larger than the first outer diameter and that forms a rim about the central cavity that is positioned in the bore so that the first outer diameter and second outer diameter engage the first inner diameter and second inner diameter, respectively;
   a series of fingers extending from the second portion of the piston head circumferentially around the bore and engaging the rim of the cup; and
   a hollow rod extending within the central cavity and within the first portion and the second portion of the cup and secured to the cup.

2. The assembly of claim 1, wherein each of the fingers includes a locking tab that engages the rim of the cup.

3. The assembly of claim 2, wherein the first outer diameter of the cup is securely seated in the first inner diameter of the bore.

4. The assembly of claim 3, wherein the second outer diameter of the cup is securely seated in the second inner diameter of the bore.

5. The assembly of claim 2, further comprising a load disc positioned within the end of the hollow rod that is secured to the cup.

6. The assembly of claim 5 wherein the load disc includes a hemispherical cavity facing away from the cup.

7. The assembly of claim 6, wherein the piston head is made from a composite material.

8. The assembly of claim 7, wherein the hollow rod is welded to the cup.

9. The assembly of claim 8, where the load disc is plastic.

* * * * *